Oct. 12, 1943.    S. GOLD    2,331,605
PEDAL STRUCTURE FOR EDUCATIONAL AIRPLANE COCKPIT OUTFIT
Original Filed Oct. 30, 1942    2 Sheets-Sheet 1

INVENTOR
Sam Gold
BY
ATTORNEYS

Oct. 12, 1943.  S. GOLD  2,331,605
PEDAL STRUCTURE FOR EDUCATIONAL AIRPLANE COCKPIT OUTFIT
Original Filed Oct. 30, 1942  2 Sheets-Sheet 2
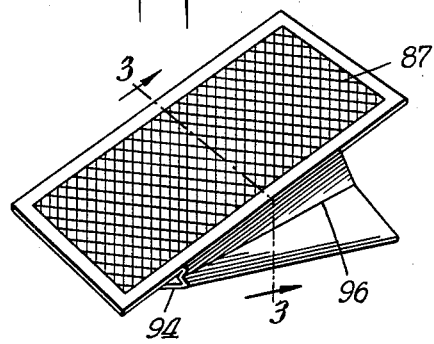
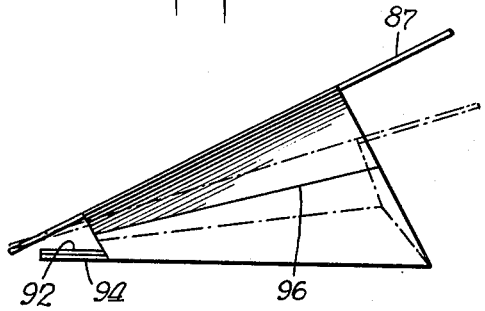
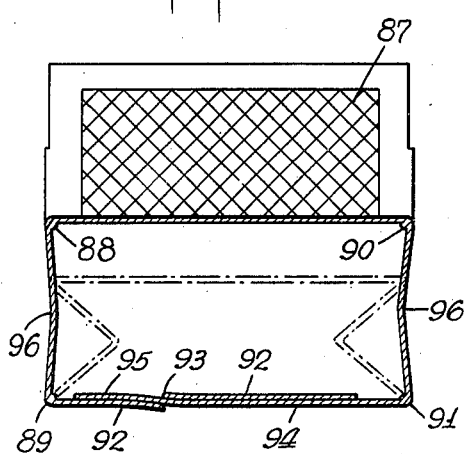
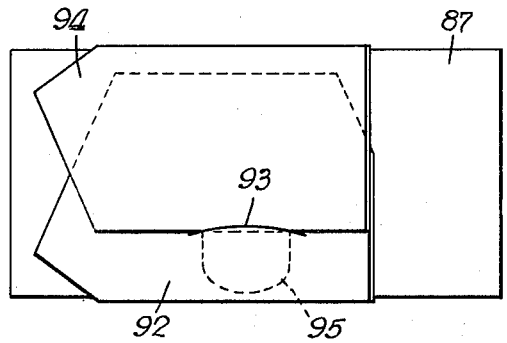
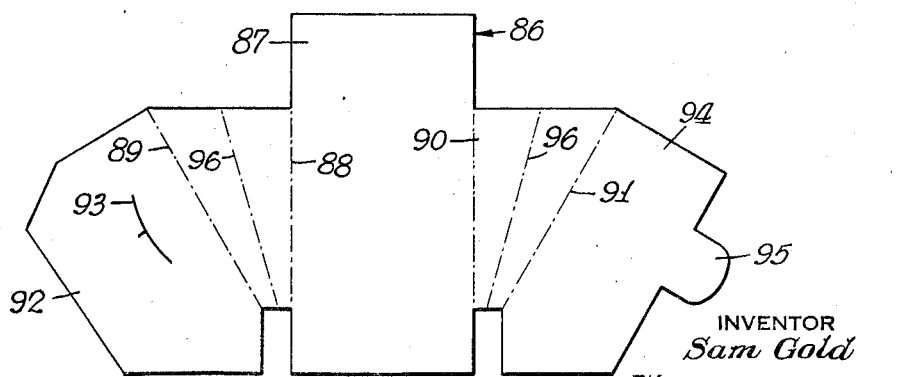
INVENTOR
Sam Gold
BY
ATTORNEYS Patented Oct. 12, 1943

2,331,605

UNITED STATES PATENT OFFICE 2,331,605

PEDAL STRUCTURE FOR EDUCATIONAL AIRPLANE-COCKPIT OUTFITS

Sam Gold, Chicago, Ill., assignor to Einson-Freeman Co., Inc., Long Island City, N. Y., a corporation of Delaware Original application October 30, 1942, Serial No. 463,955. Divided and this application April 22, 1943, Serial No. 483,991

7 Claims. (Cl. 35—12)

My present invention relates generally to cardboard structures, and has particular reference to a collapsible or knock-down structure intended primarily to constitute one of the elements of an educational outfit.

This application is a division of my co-pending patent application, Serial No. 463,955, filed October 30, 1942.

A general object of the educational outfit, as set forth more fully in said co-pending application, is to provide, in the form of relatively inexpensive cardboard structures, a highly effective means for simulating certain important parts of an actual airplane cockpit, and the relationships of such parts to one another, the structures being primarily intended for conjoint use and being of such relative sizes that a student will be enabled to experience some of the basic problems confronting an actual flier.

More particularly, the educational outfit comprises structures which simulate, respectively, the instrument-panel, the wheel-control, and the rudder-pedals of an airplane cockpit; and it is contemplated that a student sitting before the instrument-panel with his hands on the wheel-control and his feet on the pedals will thus be subjected to conditions simulating those which obtain in an actual cockpit. This experience, augmented by suitable instruction, either in a classroom or otherwise, enables the student not only to acquire a better understanding of the controls and instruments involved in flying an airplane, but also to experience and develop a familiarity with the coordination between instrument readings and hand and foot movements which is called for under varying conditions of actual flight.

This divisional patent application has particular reference to the rudder-pedals, which are so designed that foot pressure may be realistically applied against a yieldable resilience, thus simulating the "feel" of actual rudder-pedals.

The rudder-pedal structure, like the other cardboard structures forming elements of the educational outfit, has numerous detailed features which are new and useful, not only from the standpoint of construction, but also from the standpoint of simplified and inexpensive manufacture. Among these features is a special design of the rudder-pedal structure which imparts to it the desired yieldability and resilience without requiring the use of any spring or other extraneous elements.

Moreover, the rudder-pedal is composed of a minimum amount of flat cardboard material, and may be so constructed as to be readily adjustable from a completely collapsed or "knocked-down" condition to an operative set-up condition, and vice-versa, the manipulations required being in each case of an extremely simple nature, and the set-up structure being of unusual staunchness and durability.

I achieve the foregoing objects and advantages, especially with respect to the rudder-pedal, and such other objects and advantages as may hereinafter appear or be pointed out, in the manner illustratively exemplified in the accompanying drawings in which—

Figure 2 is a perspective view of a rudder-pedal structure;

Figure 3 is a cross-sectional view taken substantially along the line 3—3 of Figure 2;

Figure 4 is a bottom view of the rudder-pedal in set-up condition;

Figure 5 is a side view of the same; and

Figure 6 is a plan view of the blank of which the rudder-pedal is composed.

Figure 1:
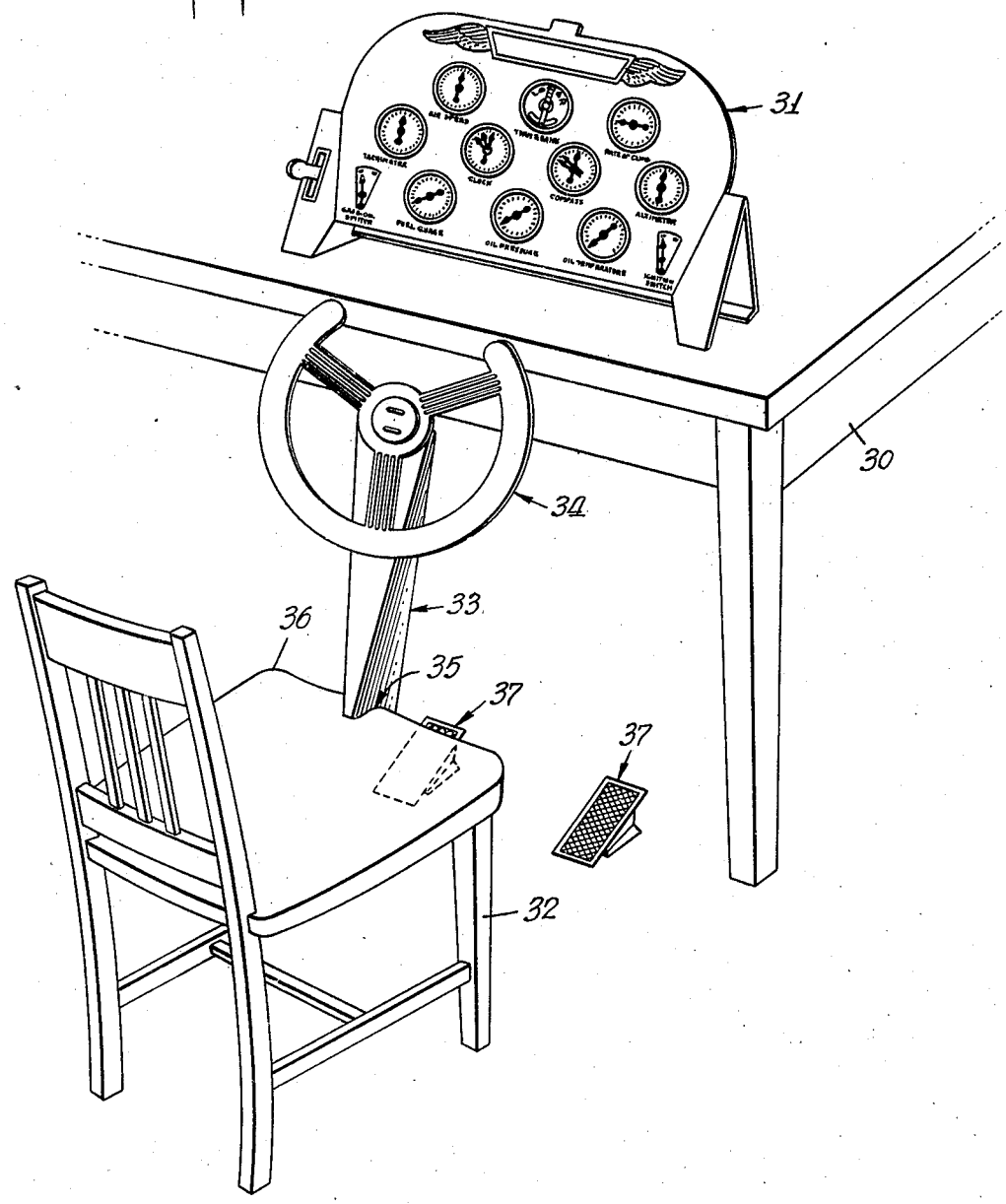
Figure 1 is a perspective view of the elements of the educational outfit shown in set-up condition and in cooperative relationship.

While the rudder-pedal is a separate and independent structure useful by itself, either as a toy or as an educational device, it is contemplated that its primary utility will reside in its employment as an element of the educational outfit shown in Figure 1. It is contemplated that the structures entering into this outfit shall be utilized in the illustrative manner indicated. I have shown a table 30 upon which an instrument panel structure 31 may be set up so that the front of it is approximately at the level of the eyes of a student who would seat himself upon the chair 32. The wheel-control structure comprises a post portion 33 and a wheel element 34, the post portion having a specially shaped lower end 35 adapted to abut against the forward edge 36 of the chair 32. The rudder-pedal structures 37 would be set up on the floor in the approximate relationships shown.

The structural details of a preferred form of rudder-pedal are shown in Figures 2–6.

The rudder-pedal is preferably composed of a single blank of flat cardboard stock, an illustration of this element being shown at 86 in Figure 6. A central substantially rectangular panel 87 is provided with laterally extending portions. Between the hinge lines 88 and 89 a panel is formed which is substantially triangular in shape. A similar panel is formed between the hinge lines 90 and 91 on the opposite side of the main panel 87.

Secured to the hinge line 89 is a part 92 having a slot 93 therein, and secured to the hinge line 91 is a part 94 provided with an attachment tab 5.

By folding the parts rearwardly along the hinge lines 88—91, the parts 92 and 94 are brought into superposed relationship beneath the main panel 87, and when the tab 95 is engaged with the slot 93, a tubular structure is formed having a bottom portion adapted to rest on the floor, and an elevated foot-receiving portion. The supporting portion is formed conjointly by the superposed parts 92 and 94. The foot-receiving portion is constituted of the main panel 87. Between these portions are triangular side connection portions.

The resultant structure is of a character in which the foot-receiving portion and supporting portion converge forwardly when the structure is set up and ready for use, as shown most clearly in Figures 1 and 2.

To permit the foot-receiving portion to be depressed, to simulate the action of an actual rudder-pedal, each of the side connecting portions is constructed in a collapsible manner, and this is preferably accomplished by providing each side connecting portion with at least one longitudinal pleat whose wings move closer together or further apart as the portion 87 is depressed or released. I have illustratively shown a construction in which each of the side connecting portions is provided with a middle fold line 96 thereby forming an inwardly turned pleat. The cardboard at the hinge lines 88—91 and along the folds 96 is caused to have a sufficient inherent resilience to yieldably resist a collapse of the side connecting portions when the foot-receiving portion 87 is depressed. Accordingly, a structure is provided which simulates, in a unique manner, the yieldable resistance which an actual rudder-pedal presents, and this desirable result is accomplished by an extremely simple cardboard structure which is totally devoid of any extraneous springs or other parts.

In dot-and-dash lines in Figures 3 and 5, I have indicated the relative positions of the parts when the rudder-pedal is depressed. When the pressure is released, the inherent resilience of the cardboard restores the rudder-pedal to its normal position.

In general, it will be understood that the details herein described and illustrated may be modified by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is:

1. A cardboard structure which simulates a rudder-pedal of an airplane cockpit, comprising a substantially tubular structure having a bottom supporting portion adapted to rest on the floor, and an elevated depressible foot-receiving portion, said tubular structure having collapsible side connecting portions hingedly arranged between the bottom supporting portion and the elevated foot-receiving portion, the hinge lines having sufficient inherent resilience to yieldably resist collapse of said side connecting portions.

2. A knock-down cardboard structure which, when set up, simulates a rudder-pedal of an airplane cockpit, comprising an element formed of flat cardboard stock foldable into a tubular structure having a bottom supporting portion adapted to rest on the floor, and an elevated depressible foot-receiving portion.

3. A knock-down cardboard structure which, when set up, simulates a rudder-pedal of an airplane cockpit, comprising an element formed of flat cardboard stock foldable into a tubular structure having a bottom supporting portion adapted to rest on the floor, and an elevated depressible foot-receiving portion, said portions lying in planes which converge forwardly so that the foot-receiving portion is inclined to the horizontal when the structure is set up and used.

4. A knock-down cardboard structure which, when set up, simulates a rudder-pedal of an airplane cockpit, comprising a bottom supporting portion adapted to rest on the floor, an elevated depressible foot-receiving portion arranged at an angle thereto, and collapsible side connecting portions, each of said portions being formed of flat cardboard stock.

5. A knock-down cardboard structure as set forth in claim 4, each of said side connecting portions being hinged to the corresponding side edges of the supporting and foot-receiving portions respectively, and all of said portions being parts of a single normally flat element provided with fold lines defining said hinges.

6. A knock-down cardboard structure as set forth in claim 4, each of said side connecting portions having at least one longitudinal pleat whose wings move closer together or further apart as the foot-receiving portion is depressed or released.

7. A knock-down cardboard structure as set forth in claim 4, each of said side connecting portions being hinged to the corresponding side edges of the supporting and foot-receiving portions, respectively, and being provided with at least one longitudinal pleat, the cardboard at the hinge lines and at the fold of said pleat having sufficient inherent resilience to yieldably resist collapse of said side connecting portions when the foot-receiving portion is depressed.

SAM GOLD.